United States Patent [19]
Rooij

[11] 4,011,495
[45] Mar. 8, 1977

[54] HIGH VOLTAGE GENERATOR ARRANGEMENT
[75] Inventor: Frits Rooij, Rozenburg, Netherlands
[73] Assignee: N. V Optische Industrie "De Oude Delft", Netherlands
[22] Filed: July 2, 1975
[21] Appl. No.: 592,467
[30] Foreign Application Priority Data
  July 9, 1974  Netherlands ............... 7409242
[52] U.S. Cl. .................... 321/18; 331/113 A
[51] Int. Cl.² ........................ H02M 7/537
[58] Field of Search ............ 321/15, 18, 45 R; 331/113 A; 250/213 VT, 207, 214 SW
[56] References Cited
  UNITED STATES PATENTS
  3,067,378  12/1962  Paynter .......... 321/45 R X
  3,694,659  9/1972  Ramsay et al. ........ 321/15

Primary Examiner—William M. Shoop
Attorney, Agent, or Firm—Marn & Jangarathis

[57] ABSTRACT

High voltage arrangement for an image intensifier with automatic brightness control, comprising a transistor oscillator including a transformer having a feedback winding, a voltage multiplier connected to the transformer and a control circuit, the control circuit including an auxiliary winding of said transformer connected in series with said feedback winding, and a control transistor connected as current source, the control transistor having its collector-emitter circuit connected through one or more diodes to said auxiliary winding.

2 Claims, 1 Drawing Figure

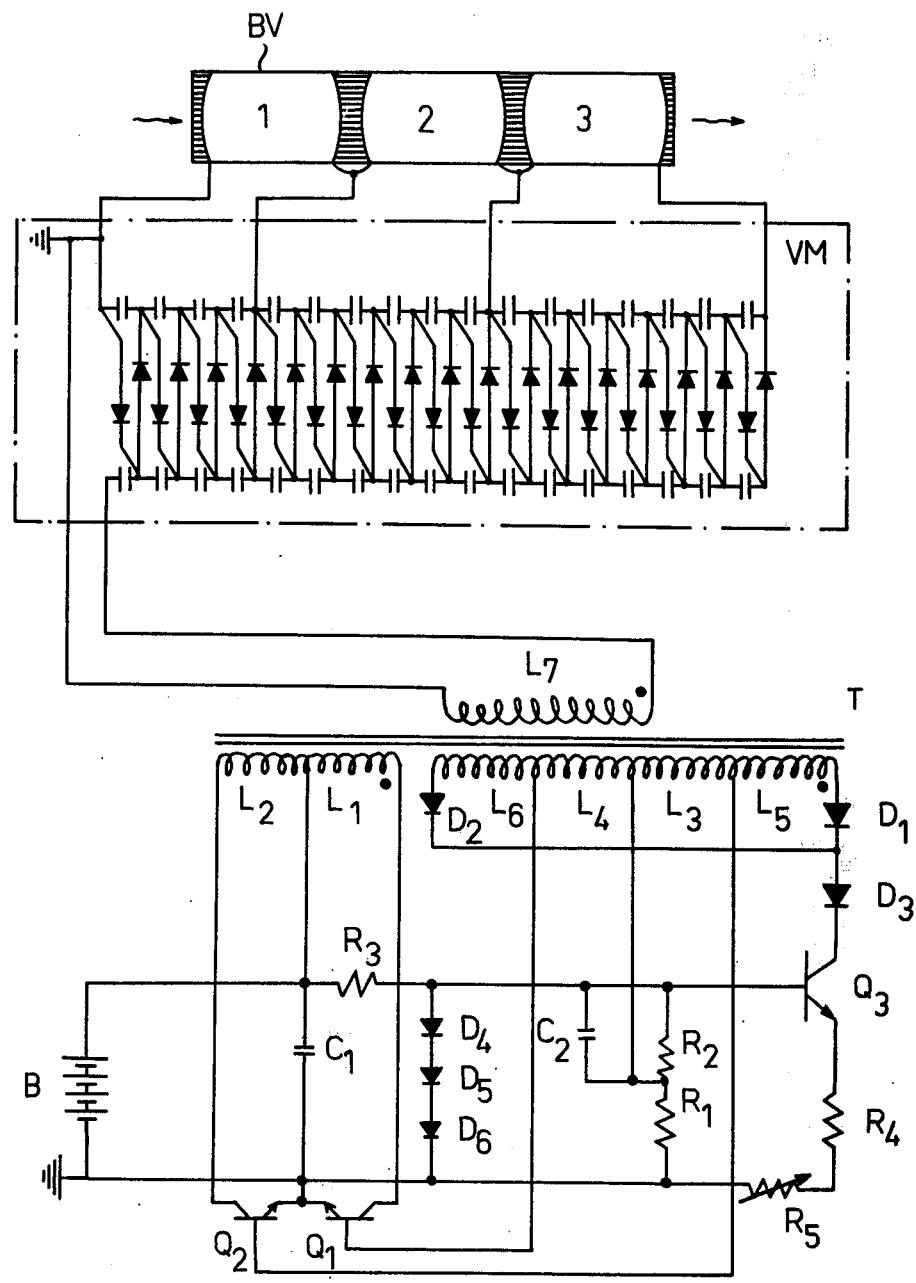

HIGH VOLTAGE GENERATOR ARRANGEMENT

The invention relates to a high voltage generator arrangement particularly for use with an image intensifier and comprising a transistor oscillator including a transformer having a feedback winding, a voltage multiplier connected to the transformer and a circuit responsive to the load on the arrangement for controlling the power supplied by the arrangement.

Such an arrangement is known from French patent No. 2.033.004. For the purpose of automatically controlling the image brightness of an image intensifier connected to it, this prior arrangement comprises a current limiter circuit includng a transistor having its emitter-collector circuit included in the supply circuit of the oscillator, and a Zener diode connected between the base of this transistor and one end of a resistor included in the emitter lead of this transistor, which end is connected through a diode to the supply source. In this arrangement, an increase in the current taken up by the arrangement due to an increase in the exposure level at the entrance of the image intensifier will result in an increase in the current derived by the oscillator from the supply source and thus in an increase in the voltage drop across the emitter resistor of the transistor connected in the supply circuit of the oscillator. When the voltage drop across this emitter resistor reaches the threshold value of the Zener diode, a further increase in the current through this emitter resistor will result in a decrease in the base-emitter potential of the transistor from this point, as a result of which the resistance of the emitter-collector circuit of this transistor and thus the voltage drop across this circuit are increased and the voltage at the input of the oscillator will decrease. As, initially, the decrease of the input resistance of the oscillator is, upon increasing load thereon, for the greater part compensated by the increase in the resistance of the emitter-collector circuit of the control transistor, the current taken up from the supply source will only slightly increase from the level at which the Zener diode is actuated within a certain range of exposure levels at the entrance of the image intensifier, while the voltage at the input of the oscillator and thus the supply voltage of the image intensifier decrease such that throughout this range a substantially constant power is supplied to the intensifier. Once a given exposure level at the entrance of the image intensifier, which level is to be regarded the upper limit of the aforesaid range, is reached, the voltage at the input of the oscillator and thus the supply voltage of the image intensifier will relatively rapidly decrease below the minimum value required for the operation of this intensifier.

Although by means of the control circuit used in the prior arrangement an automatic brightness control of the image intensifier is achieved throughout a range of exposure levels at its entrance sufficient for a great number of applications, due to the limitation of the supply current of the oscillator this arrangement entails the drawback that this control circuit takes up relatively much power, which is lost. Moreover, particularly when using a low-voltage supply battery, such a voltage drop across the control transistor is often undesirable.

The above drawbacks make themselves felt particularly when the generator arrangement is to be disposed in a highly restricted space and a battery is to be used as the supply source, as this is especially the case in night glasses employing image intensifiers.

It is an object of the invention to provide a high voltage generator arrangement of the above type which does not entail the above drawbacks as the control circuit includes an auxiliary winding an the transformer and series-connected with the feedback winding, and a control transistor connected as current source, the control transistor having its collector-emitter circuit connected through one or more diodes to the auxiliary winding.

In the arrangement according to the invention a voltage is developed across this auxiliary winding, the magnitude of which voltage depends on the current supplied to the load on the arrangement, and a portion of the direct base current applied to the transistor oscillator through the feedback winding, which portion depends on the magnitude of the above voltage, is discharged by the control transistor so as to maintain the power supplied by the oscillator at a constant level throughout a control range determined by the dimensioning of the control circuit.

As the base current of the oscillator is considerably smaller than the load current of the generator arrangement, as taken up by the oscillator from the supply source, substantially no power loss will occur in this circuit.

In connection with the generator arrangement according to the invention reference may further be made to German patent application No. 2.146.441, open to public inspection, which publication discloses similar generator arrangements particularly for use with image intensifiers, which arrangements include circuits for automatic brightness control. However, similar to those disclosed in the above French patent, these control circuits are adapted to control the supply current of the oscillator while, moreover, for achieving a wide control range as desired for certain applications, they are composed of a large number of components.

The invention will be elucidated in detail hereinafter with reference to the associated drawing showing a diagram of an embodiment of a generator arrangement according to the invention including a push-pull oscillator, which embodiment is chosen by way of example.

The circuit arrangement shown in the drawing comprises a push-pull oscillator including two transistors $Q_1$ and $Q_2$ having their emitters connected to each other and to a terminal of a d-c source B, and having their collectors each connected through a half of a centre-tapped winding $L_1$, $L_2$ of a transformer T to the other terminal of the d-c source B. The transformer T further includes a centre-tapped feedback winding $L_3$, $L_4$, the ends of which are each connected to the base of one of the two transistors. The centre tap of this feedback winding is connected to the junction point of two series-connected setting resistors $R_1$ and $R_2$, resistor $R_1$ being further connected to the terminal of the d-c source B which is connected to the emitters of transistors $Q_1$ and $Q_2$ and resistor $R_2$ being connected through a further setting resistor $R_3$ to the other terminal of d-c source B.

A capacitor $C_1$ for stabilizing the supply voltage of the oscillator is connected between the junction point of the emitters of transistors $Q_1$ and $Q_2$ and the centre tap of transformer winding $L_1$, $L_2$, while a capacitor $C_2$ is connected in parallel to the setting resistor $R_2$, which capacitor $C_2$ is charged, after the actuation of the oscillator, to a potential equal to the bias voltage occurring across resistor $R_2$.

Transformer T further comprises an auxiliary winding composed of two equal sections $L_5$ and $L_6$, section $L_5$ being connected in series with one half $L_3$ and section $L_6$ with the other half $L_4$ of the feedback winding. The free ends of sections $L_5$ and $L_6$ of the auxiliary winding are connected through diode $D_1$ and diode $D_2$, respectively, to each other and through at least one further diode $D_3$ to the collector of a control transistor $Q_3$, which transistor has its base connected to the junction point of resistors $R_2$ and $R_3$ and its emitter through a fixed resistor $R_4$ and a variable resistor $R_5$ to the junction point of the emitters of transistors $Q_1$ and $Q_2$, which junction point is directly connected to d-c source B.

A series-connection of a plurality of diodes $D_4$, $D_5$ and $D_6$, which serves to stabilize the bias voltages of transistors $Q_1$, $Q_2$ and $Q_3$, is connected between the junction point of resistors $R_2$ and $R_3$ and the junction point of the emitters of transistors $Q_1$ and $Q_2$. Diode $D_3$ serves to compensate for the effect of the temperature dependence of diodes $D_4$, $D_5$ and $D_6$ on the control circuit including transistor $Q_3$.

Transformer T further comprises an output winding $L_7$ connected to a voltage multiplier VM composed in a known per se manner of a cascaded arrangement of capacitors and diodes. An image intensifier BV of any known per se type and composed of three stages 1, 2 and 3 is connected to the voltage multiplier VM.

When in the circuit arrangement described the photocathode at the entrace of image intensifier BV is not exposed to light, this intensifier will not take up current from cascaded arrangement VM and the oscillator will not supply current to this arrangement VM. In this condition, the a-c voltage produced across the series-connected windings $L_3$–$L_6$ of transformer T will have a maximum value. Once due to an exposure of the photocathode at the entrance of image intensifier BV this intensifier starts to take up current from the cascaded arrangement VM, the resultant increase in the load on the oscillator will lead to a decrease in the a-c voltage produced across the winding $L_1$, $L_2$ and thus in the a-c voltage across windings $L_3$–$L_6$ of the transformer.

The voltage-divider formed by resistors $R_1$, $R_2$ and $R_3$ and the auxiliary winding $L_5$, $L_6$ on transformer T are dimensioned so that, throughout a range of exposure intensities at the entrance of the image intensifier as required for the use of this intensifier, the a-c voltage occurring during operation across windings $L_3$–$L_6$ has an amplitude which is greater than the base potential of transistor $Q_3$ as determined by the voltage divider. As a result thereof, the transistor $Q_3$ will conduct during those portions of the cycles of the a-c voltage occurring across windings $L_3$–$L_6$ and applied through diodes $D_1$, $D_2$ and $D_3$ to its collector, during which this a-c voltage exceeds the base potential of this transistor and, in dependence upon the magnitude of this a-c voltage, a greater or smaller part of the direct base current applied through winding $L_3$, $L_4$ to transistors $Q_1$ and $Q_2$ will be discharged through transistor $Q_3$. Transistor $Q_3$ is connected as current source by means of resistors $R_4$ and $R_5$ included in its emitter circuit and this transistor will therefore conduct a constant collector-emitter current in its conductive state. As a result thereof, throughout the control range in which the a-c voltage occurring across windings $L_3$–$L_6$ is large relative to the base potential of this transistor, the additional direct base current, which is applied to transistors $Q_1$ and $Q_2$ upon decrease in this a-c voltage, will increase substantially linearly with the decrease of the amplitude of this a-c voltage. As the increase in the power produced by the oscillator is direct proportional to the increase in the direct base current of transistors $Q_1$ and $Q_2$, upon increasing exposure intensity at the entrance of the image intensifier BV the power supplied to this intensifier and thus the brightness of the image on the anode screen at the exit of the intensifier will remain constant throughout the control range determined by the control circuit including transistor $Q_3$.

The invention is not limited to the embodiment described above and may be applied, for example, to a high voltage generator arrangement including a transistor oscillator which is not connected in push-pull configuration. In the latter case the auxiliary winding may have the form of an undivided winding connected in series with the feedback winding. Furthermore, instead of the n-p-n transistors shown in the drawing, the arrangement may also employ p-n-p transistors, in which case both the supply source and the diodes should be poled oppositely. Moreover, instead of transistors also other active elements, such as electron tubes, or field-effect transistors may be used.

I claim:

1. In a high voltage generator arrangement particularly adapted for use with an image intensifier, the arrangement including transistor oscillator means which includes a transformer for supplying A.C. voltage and having a feedback winding for applying base current to said transistor oscillator means and an output winding, a voltage multiplier connected to said output winding, and circuit means responsive to the load on said arrangement for controlling power supplied by said arrangement, the improvement in said control circuit means comprising:

auxiliary winding means on said transformer connected in series with said feedback winding;

a control transistor connected as a current source within said circuit means;

diode means for connecting the collector-emitter circuit of said control transistor to said auxiliary winding means; and means including said auxiliary winding means for establishing a base potential for said control transistor to cause portions of the direct base current applied from said feedback winding to said transistor oscillator means to be discharged through said control transistor whenever the magnitude of the AC voltage across said feedback and auxiliary winding means exceeds said base potential.

2. The high voltage generator arrangement according to claim 1 wherein said feedback winding comprises a center-tapped winding on said transformer and said transistor oscillator means includes a push-pull oscillator including two transistors having their bases connected, respectively, to opposed ends of said center-tapped feedback winding, the improvement further comprising said auxiliary winding means being formed of two equal sections each of which is connected in series with one half of said center-tapped feedback winding and having the free end of each section connected through at least one diode to the collector of said control transistor.

* * * * *